US009983919B2

(12) United States Patent
Ly

(10) Patent No.: US 9,983,919 B2
(45) Date of Patent: May 29, 2018

(54) DYNAMIC ERROR CODE, FAULT LOCATION, AND TEST AND TROUBLESHOOTING USER EXPERIENCE CORRELATION/VISUALIZATION SYSTEMS AND METHODS

(71) Applicant: The United States of America as represented by the Secretary of the Navy, Washington, DC (US)

(72) Inventor: Paul Ly, Alhambra, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 125 days.

(21) Appl. No.: 15/074,517

(22) Filed: Mar. 18, 2016

(65) Prior Publication Data

US 2016/0342451 A1 Nov. 24, 2016

Related U.S. Application Data

(60) Provisional application No. 62/163,467, filed on May 19, 2015.

(51) Int. Cl.
*G06F 11/00* (2006.01)
*G06F 11/07* (2006.01)
(52) U.S. Cl.
CPC ........ *G06F 11/079* (2013.01); *G06F 11/0739* (2013.01); *G06F 11/0769* (2013.01)
(58) Field of Classification Search
CPC ............. G06F 11/0736; G06F 11/0739; G06F 11/0751; G06F 11/0769; G06F 11/0775;
(Continued)

(56) References Cited

U.S. PATENT DOCUMENTS 5,408,412 A * 4/1995 Hogg .................... G01M 15/05
701/29.1
5,521,958 A 5/1996 Selig et al.
(Continued)

OTHER PUBLICATIONS

Cummins INSITE Export Diagnostic System (EDS), retrieved on Dec. 21, 2015 from: https://insite.cummins.com/insite/eds/index. html; 4 pages.

(Continued)

*Primary Examiner* — Marc Duncan
(74) *Attorney, Agent, or Firm* — Christopher A. Monsey

(57) ABSTRACT

An apparatus and method for testing and troubleshooting systems, such as remote systems, have been developed that provide for a test control system configured to perform testing on a system under test. The test control system may include an electronic device operable to display a system fault code failure matrix visualization that may include fault codes and/or fault locations for one or more subsystems of a SUT. The test control system may also include an aggregated subsystem fault locations database that stores previously identified system or subsystem fault locations of the SUT that may lead to a source of an issue causing a particular fault code for the SUT, where the electronic device is operable to access the aggregated subsystem fault locations database to obtain the various previously identified fault locations. The previously identified system or subsystem fault locations may be based on previous testing of a system or subsystem.

3 Claims, 8 Drawing Sheets

(58) Field of Classification Search
CPC ........ G06F 11/079; H04L 41/16; H04L 41/22; H04L 41/0631; H04L 41/0677
See application file for complete search history.

(56) References Cited

U.S. PATENT DOCUMENTS

| | | | |
|---|---|---|---|
| 6,012,152 A | 1/2000 | Douik et al. | |
| 6,434,455 B1* | 8/2002 | Snow | G06F 11/2294 701/31.4 |
| 6,574,537 B2* | 6/2003 | Kipersztok | G05B 23/0278 701/31.8 |
| 6,714,846 B2 | 3/2004 | Trsar et al. | |
| 6,748,304 B2* | 6/2004 | Felke | G05B 23/0278 701/31.6 |
| 6,829,527 B2* | 12/2004 | Felke | G06F 17/30595 701/29.3 |
| 7,444,216 B2* | 10/2008 | Rogers | G06F 3/0481 701/31.4 |
| 7,739,007 B2 | 6/2010 | Logsdon | |
| 8,380,385 B2* | 2/2013 | Yukawa | G06F 11/0739 701/24 |
| 8,620,511 B2 | 12/2013 | Rother | |
| 8,738,760 B2 | 5/2014 | Adams, Jr. et al. | |
| 8,954,222 B2* | 2/2015 | Costantino | G05B 23/0272 701/29.1 |
| 9,562,830 B2* | 2/2017 | Rother | G01M 17/007 |
| 9,712,413 B2* | 7/2017 | Windell | G06K 9/00536 |
| 2002/0059269 A1* | 5/2002 | McQuown | B61L 27/0094 |
| 2006/0126801 A1 | 6/2006 | Laperi et al. | |
| 2009/0313505 A1* | 12/2009 | McCroskey | G06F 11/006 714/37 |

OTHER PUBLICATIONS

OneTouch AT Network Assistant, retrieved on Dec. 21, 2015 from: http://www.flukenetworks.com/enterprise-network/network-testing/OneTouth-AT-Nework-Assistant; 17 pages.
TechEXPERT, retrieved on Dec. 21, 2015 from: http://www.flukenetworks.com/telecom-tools/productivity/TechEXPERT; 3 pages.

* cited by examiner

| J-29 | | FAULT LOCATIONS | | |
|---|---|---|---|---|
| FAULT CODE | LOCATION 1 | LOCATION 2 | LOCATION 3 | |
| 1110 | J29-1 TO 1240 | P29-1 TO 1240 | NEW LOCATION |
| 1120 | J29-2 TO 1240 | P29-2 TO 1240 | NEW LOCATION |
| 1130 | J29-3 TO 1240 | P29-3 TO 1240 | NEW LOCATION |
| 1140 | J29-4 TO 1240 | P29-4 TO 1240 | NEW LOCATION |
| 1150 | J29-5 TO 1240 | P29-5 TO 1240 | NEW LOCATION |
| 1160 | J29-6 TO 1240 | P29-6 TO 1240 | NEW LOCATION |
| 1170 | J29-7 TO 1240 | P29-7 TO 1240 | NEW LOCATION |
| 1180 | J29-8 TO 1240 | P29-8 TO 1240 | NEW LOCATION |
| 1190 | J29-9 TO 1240 | P29-9 TO 1240 | NEW LOCATION |
| 1200 | J29-10 TO 1240 | P29-10 TO 1240 | NEW LOCATION |

| XPT TO Y PY FAULT CODE | FAULT LOCATIONS | | |
| --- | --- | --- | --- |
| | LOCATION 1 | LOCATION 2 | LOCATION 3 |
| 1710 | ORDER RTN TO 1240 | J5-4 TO GRND | NEW LOCATION |
| 1720 | ORDER RTN TO GRND | P5-2 TO 1240 | NEW LOCATION |
| 1730 | J5-4 TO P5-7 | J8-1 TO GRND | NEW LOCATION |
| 1740 | J9-5 TO J-9 | J9-5 TO P25 | NEW LOCATION |
| 21460 | J10-4 TO 1240 | P10 TO 1240 | NEW LOCATION |
| 21470 | J10-5 TO +EXL LIMIT | P10-2 TO +ELX | NEW LOCATION |
| 21480 | J10-6 TO -ELX LIMIT | P51-3 TO E/M FWD | NEW LOCATION |
| 21490 | J10-7 TO 1240 | P51-4 TO 1240 | NEW LOCATION |
| 21500 | J10-8 TO +E/M | P51-5 TO TAIL #1 | NEW LOCATION |
| 21510 | J10-9 TO -E/M | P51-6 TO CH.B | NEW LOCATION |
| 21520 | J10-11 TO +E/M FWD CURR | P51-7 TO 1240 | NEW LOCATION |
| 21530 | J10-12 TO 1240 | P51-8 TO 1240 | NEW LOCATION |
| 21540 | J10-13 TO 1240 | P51-9 TO 1240 | NEW LOCATION |

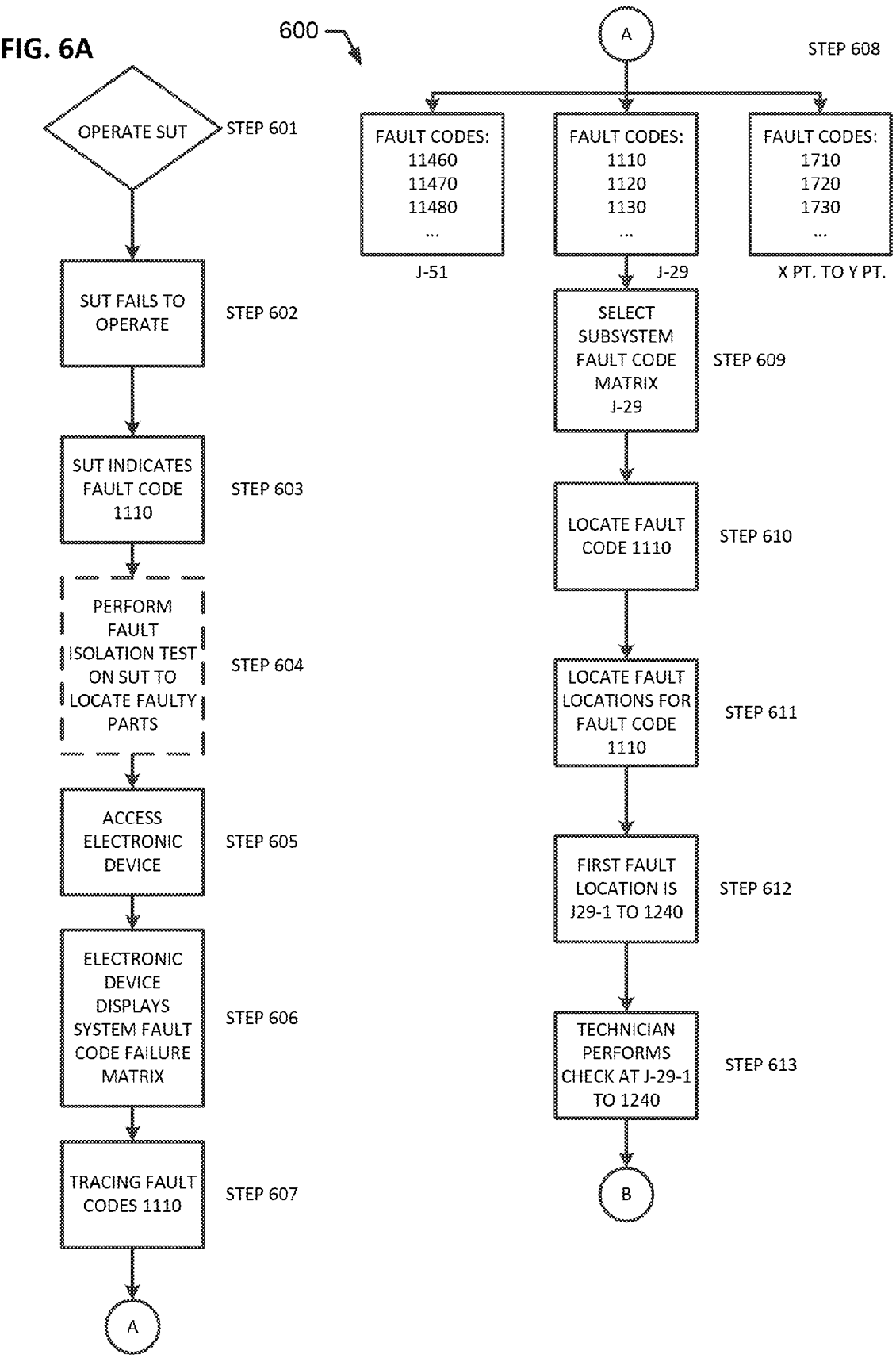

DYNAMIC ERROR CODE, FAULT LOCATION, AND TEST AND TROUBLESHOOTING USER EXPERIENCE CORRELATION/VISUALIZATION SYSTEMS AND METHODS

CROSS-REFERENCE TO RELATED APPLICATION

This application claims priority to U.S. Provisional Application Ser. No. 62/163,467, filed on May 19, 2015, the disclosure of which is expressly incorporated herein by reference.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,245) is assigned to the United States Government and is available for licensing for commercial purposes. Licensing and technical inquiries may be directed to the Technology Transfer Office, Naval Surface Warfare Center Corona Division.

FIELD OF THE DISCLOSURE

The invention relates generally to apparatus and methods for testing or troubleshooting various systems and, more specifically, the testing or troubleshooting of remote systems including subsystems and devices.

BACKGROUND

Providing rapid and accurate system testing or troubleshooting for various systems, such as Unmanned Aerial Vehicle (UAV) systems or systems onboard ships, presents various challenges. One challenge is that these systems are often located in remote areas or locations such that experienced technicians (e.g., those that may be familiar with the systems, such as highly qualified and experienced personnel) are not onsite (e.g., in remote or field locations where equipment may be located for operational purposes) to perform system testing or troubleshooting that may be needed for proper operation of the systems. For example, when ships are underway, experienced technicians may not be onboard to perform required testing or troubleshooting of the ship's onboard systems. In addition, these systems may include subsystems where technicians may be better trained to troubleshoot a particular subsystem but not another. As such, a technician onsite with a remote system needing service in a particular subsystem may not have the proper training, or may not be as efficient, as another technician who may not be onsite, to test or troubleshoot an issue with the particular subsystem. For example, these systems may include subsystems, where technicians may specialize in a particular subsystem. Those that specialize in a particular subsystem may be more knowledgeable as to how to test or troubleshoot that subsystem by testing or troubleshooting a particular subsystem fault location (e.g., a location on the subsystem to test or to troubleshoot the subsystem). For example, if a subsystem of a system fails, the system may indicate (e.g., display) a fault code, indicating that the subsystem has failed. Technicians more experienced with a particular subsystem may be more knowledgeable as to the subsystem fault location to test or troubleshoot to determine the issue.

Subsystems of a UAV system may include, for example, a sensor subsystem and an actuator subsystem. As another example, subsystems of a ship may include, for example, a remote control subsystem and a data link subsystem. Another challenge in providing rapid and accurate system troubleshooting for such systems is a possible continual loss of experienced technicians at such remote locations. For example, experienced technicians may decide to move on to another position, leaving the work of troubleshooting or testing systems to others who may not be as experienced. As a result of these and other challenges, such systems may not be fully operational when needed. For example, when a system breaks down, the systems may be down much longer than they could otherwise have been if an experienced technician were available to test or troubleshoot the system. Instead of having an experienced technician perform the testing or troubleshooting, a technician with low experience or one who may lack the technical knowledge to test or troubleshoot the system may be the only one immediately available to fix the broken down system. Thus there are opportunities to address needs such as the shortage of experienced technicians (e.g., subject matter experts (SME)) at field or remote locations (e.g., onboard ships) to test or troubleshoot systems, such as complex systems onboard ships or UAV systems, or their subsystems.

SUMMARY OF THE DISCLOSURE

An apparatus and method for testing and troubleshooting systems, such as remote systems, have been developed that provide for a test control system (e.g., fault diagnostic system) configured to perform testing on a system under test (SUT) (e.g., device under test (DUT)), such as a system or subsystem of UAV or ship, where the SUT may produce one or more fault codes in response to a system or subsystem failure. The test control system may include an electronic device that includes an input/output system configured to interact with an operator of the electronic device, control logic, and a display. For example, the electronic device may include a handset, laptop, or tablet, which includes a touch-screen display for user input/output as well as control logic that may include a processor and a display area. The control logic may be operable to provide for display a system fault code failure matrix that may include fault codes and/or fault locations (e.g., fix locations) for one or more subsystems of a SUT, as described further below. A system fault code failure matrix may include one or more subsystem fault code failure matrices, where a subsystem fault code failure matrix corresponds to a subsystem of the SUT. Each subsystem fault code failure matrix may include a plurality of potential subsystem fault codes for the subsystem of the SUT, and at least one associated (e.g., corresponding) subsystem fault location for testing of the subsystem of the SUT, as described further below. The test control system may also include an aggregated subsystem fault locations database that stores previously identified system or subsystem fault locations of the SUT that may lead to a source of an issue causing a particular fault code for the SUT. The previously identified system or subsystem fault locations may be based on previous testing of a system or subsystem whereby testing or troubleshooting of the fault locations have led to a source of an issue causing a particular fault code for the SUT. The aggregated subsystem fault locations database may be part of a distributed network and made available to users at field operating locations for systems and subsystems.

In one embodiment, the control logic includes a processor, such as a central processing unit (CPU), microprocessor, digital signal processor (DSP), or any other suitable processor or computing device, that is operatively coupled to the display, to the input/output system, and to the aggregated subsystem fault locations database. The processor may be configured to obtain, from the aggregated subsystem fault locations database, a plurality of potential subsystem fault codes for the at least one subsystem of the SUT; provide a first visualization for display that includes a system fault code failure matrix that maps at least one subsystem of the SUT to a plurality of potential subsystem fault codes for the at least one subsystem of the SUT; receive, from the input/output system, an indication of a selection of at least one subsystem of the SUT; provide a second visualization for display that includes a subsystem fault code failure matrix that indicates the plurality of potential subsystem fault codes for the subsystem of the SUT; receive, from the input/output system, an indication of a fault code for a fault of the subsystem of the SUT; determine that the received indication of the fault code identifies (e.g., matches) with at least one potential subsystem fault code of the plurality of potential subsystem fault codes for the subsystem of the SUT; obtain, from the aggregated subsystem fault locations database, at least one subsystem fault location; and provide a third visualization for display that includes an indication of at least one subsystem fault location for testing of the subsystem of the SUT to determine the fault of the subsystem of the SUT.

In one embodiment, the processor is operable to provide, in response to determining that the received indication of the fault code identifies with at least one potential subsystem fault code of the plurality of potential subsystem fault codes for the subsystem of the SUT, a fourth visualization for display that includes an indication of at least one fault isolation test to be performed on the subsystem of the SUT to determine what is causing its fault. For example, the fourth visualization may indicate that a built-in-test (BIT) should be performed on the subsystem of the SUT. In another example, the fourth visualization may include a particular test to perform on the subsystem of the SUT.

In one embodiment, the processor is operable to receive, from the input/output system, an indication that testing of the subsystem fault location for testing the subsystem of the SUT was successful and, in response, provide a fourth visualization for display that includes another indication of at least another subsystem fault location for testing of the subsystem of the SUT to determine its fault. For example, if testing of a first subsystem fault location is successful (i.e., the test "passed" resulting in no errors, and thus the issue causing the fault condition was not identified), a user may, via the input/output system, confirm (e.g., acknowledge, or select) that the testing of the first subsystem fault location was successful. In response, the processor may provide a fourth visualization for display that includes a second subsystem fault location that should be tested.

In another example, the processor is operable to receive, from the input/output system, an indication of whether testing of a subsystem fault location for the subsystem of the SUT corrected the issue causing a fault condition. The processor may provide the indication to the aggregated subsystem fault locations database, such that the aggregated subsystem fault locations database can maintain a record of how many times a particular subsystem fault location for a particular fault condition (e.g., condition causing a particular fault code) resulted in correction of the fault condition, and how many times it resulted in no correction. As such, in one example, the aggregated subsystem fault locations database may use the stored information to determine the probability of a particular subsystem fault location to correct a particular fault condition, as discussed further below.

In another embodiment, the processor may receive, from the input/output system, an indication of a new subsystem fault location for testing of a subsystem of the SUT, where testing of the new subsystem fault location led to a source of the fault code for a fault of at least one subsystem of the SUT. The processor may provide a visualization for display that includes a subsystem fault code failure matrix corresponding to the subsystem of the SUT that includes a plurality of potential subsystem fault codes for the subsystem of the SUT, and at least one associated (e.g., corresponding) subsystem fault location for testing of the subsystem of the SUT. The one or more associated subsystem fault locations may include the new subsystem fault location. For example, the processor may re-provide the third visualization for display that includes the subsystem fault code failure matrix for display indicating the plurality of potential subsystem fault codes for a subsystem of the SUT and at least one associated subsystem fault location for testing of the subsystem of the SUT including the new subsystem fault location. In one embodiment, the processor is operable to provide the new subsystem fault location to the aggregated subsystem fault locations database. For example, the new subsystem fault location may be included (e.g., aggregated) as part of previously identified subsystem fault locations that are associated with a subsystem fault code for a subsystem of the SUT.

In yet another embodiment, a subsystem of a SUT may not provide fault codes. As such, a technician may troubleshoot the subsystem of the SUT to correct a fault. The technician may enter, via the input/output system, a subsystem fault location that was tested and led to correction of a fault. In one example, the technician may enter, via the input/output system, the troubleshooting steps leading to correction of the fault to the subsystem of the SUT. In one embodiment, the processor is operable to provide the subsystem fault location to the aggregated subsystem fault locations database. In another embodiment, the processor is operable to provide to the aggregated subsystem fault locations database the troubleshooting steps leading to correction of the fault to the subsystem of the SUT. Thus, the aggregated subsystem fault locations database may store subsystem fault locations as well as troubleshooting steps associated with faults of subsystems of SUTs regardless of whether the subsytems produce fault codes.

In one embodiment, the processor is operable to provide for display a plurality of troubleshooting steps to be taken at a subsystem fault location for a subsystem of a SUT. For example, upon receiving, from the input/output system, an indication of a fault code for a fault of the subsystem of the SUT, the processor may determine that the received indication of the fault code identifies (e.g., matches) with at least one potential subsystem fault code of the plurality of potential subsystem fault codes for the subsystem of the SUT, and provide for display a plurality of troubleshooting steps to be taken at a subsystem fault location for the subsystem of a SUT.

In one example, a subsystem fault code may represent an error in the compilation or execution of software. For example, software (which may also include firmware) may be executed by a subsystem of a SUT, and produce an error.

The error may be displayed or otherwise communicated via, for example, a debug terminal. As another example, a subsystem fault code may represent an error in the compilation of software. For example, a technician may compile software for loading onto a subsystem of a SUT. The compilation, however, may fail, in one example, as a result of an error, such as a syntax error. For example, the error may be a "Syntax Error XXX" or "Logic Error XXX" where "XXX" represents some identifier, such as a line number. These software execution and compilation errors may be represented as subsystem fault codes. As such, a technician or a programmer may input, via the input/output system, an error, such as a syntax error, encountered when debugging or testing a subsystem of a SUT. In response, the processor may determine that the received subsystem error identifies (e.g., matches) with at least one error of a plurality of subsystem errors for the subsystem of the SUT. The processor may then provide for display a plurality of troubleshooting steps (e.g., instructions) to be taken to correct the subsystem error.

In one embodiment, a fault diagnostic system is provided that includes a test system configured to perform testing on a SUT to produce one or more fault codes (FC) in response to a system failure of the SUT; and a diagnostic system comprising a display, a processor, and a storage medium operable to store a plurality of machine readable instructions that when executed by the processor cause the processor to generate a first, second, third, and fourth user experience (UX) and visualization on said display configured to graphically and textually interact with an operator using a plurality of graphical user interface (GUI) elements, wherein said first UX/visualization comprises a flow chart visualization comprising a plurality of troubleshooting steps, said second UX/visualization comprises a first system block diagram at a center section comprising a plurality of subsystems for the SUT and a plurality of first fault code fault location matrixes (FCFLM) associated with each said plurality of subsystems displayed around a periphery of the first system block diagram, wherein each FCFLM comprises a plurality of fault codes (FC) and related fault locations (FL) which are associated with previously identified FLs which have been a source of the FC as recorded by previous test and troubleshooting activities (TTA), said third UX/visualization comprises a detail view of said FCFLM comprising said FCs and FLs, and said fourth UX/visualization comprises a search GUI associated with an element of said first UX/visualization process flow chart which enables a user to input a FC which then toggles to one of said third UX/visualizations associated with an input FC, wherein said first UX/visualization is configured to toggle between said first UX/visualization and said second through fourth UX/visualizations, said first UX/visualization is further configured to present a GUI element which selects or deselects a FL associated with a FC input so as to permit a reselection of a FC to generate a new FC/FL FCFLM display element if a previously selected FC/FL is determined not to clear a fault.

Among other advantages, the apparatus and methods may be used to retain and rapidly make available collected trouble shooting knowledge across multiple sites, such as across multiple remote sites, without having SMEs of physically located at a system location, e.g., onboard ships. For example, an exemplary system may include a aggregated subsystem fault locations database which either stores data entries at all sites or is available at a central site with backups at each location which are used in the event of a network outage or significant network latency. The methods and apparatus also allow technicians to upload to a aggregated subsystem fault locations database fault locations associated with systems or subsystems of a system that led to the correction (e.g., fixing) of that particular subsystem or system indicated by a particular fault code. As such, technicians working on remote system (such as a remote UAV or ship underway) may take advantage of a previously identified subsystem fault location for a potential subsystem fault code that may have been identified by a technician, where testing or troubleshooting of the previously identified subsystem fault location cleared the subsystem fault code. For example, the methods and apparatus allow a technician working on a remote system or subsystem of a system to access the previously identified subsystem fault locations from the aggregated subsystem fault locations database. As another example, the aggregated subsystem fault locations database may be updated with subsystem fault locations via, for example, the Internet, which may be in real-time, such that the updated subsystem fault locations may be made available to technicians located at remote locations (such as onboard ships). As such, technicians are provided with the latest subsystem fault locations stored by the aggregated subsystem fault locations database via the Internet. Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The detailed description of the drawings particularly refers to the accompanying figures in which:

FIG. 4 is an example of a subsystem fault code failure matrix in accordance with one example of the present disclosure;

FIG. 5 is another example of a subsystem fault code failure matrix in accordance with another example of the present disclosure;

FIG. 6A is a flowchart of an example method for testing a SUT in accordance with one example of the present disclosure;

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
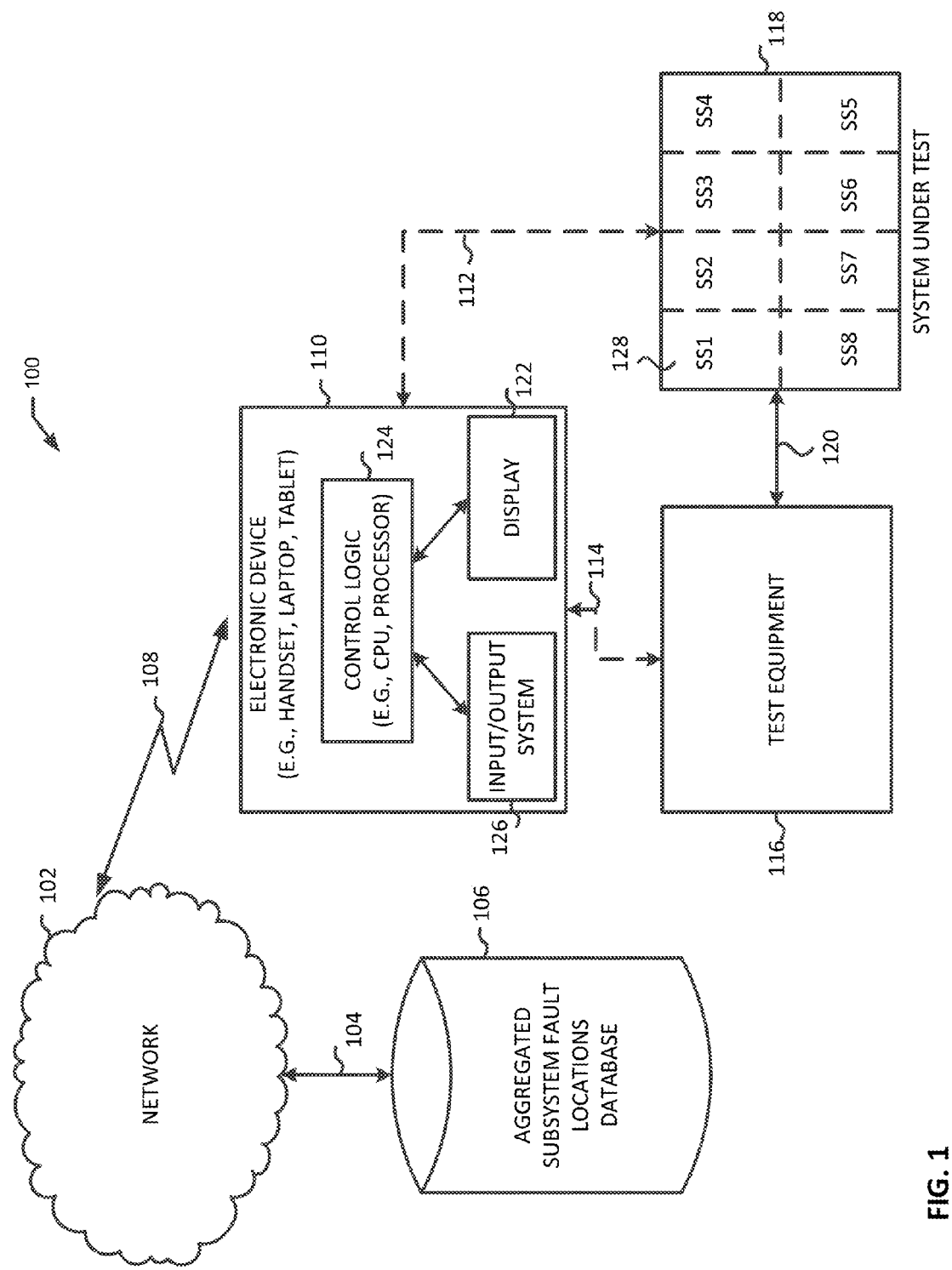
FIG. 1 is a functional block diagram of a test control system that includes an electronic device and an aggregated subsystem fault locations database according to one example of the present disclosure.

FIG. 1 shows a functional block diagram of a test control system 100 that includes an electronic device 110, an aggregated subsystem fault locations database 106, test equipment 116, and a system under test (SUT) 118. SUT 118 may include one more subsystems 128. In some examples, electronic device 110 may be a handset, laptop, tablet, or any other suitable electronic device. As indicated in the figure, electronic device 110 may include display 122, input/output system 126, and control logic 124. Control logic 124 may be operably coupled to display 122. Control logic 124 may also be operatively coupled to input/output system 126. In some embodiments, some or all of the functions of electronic device 110 may be performed by any suitable processor or processors, or by any other suitable logic such as discreet logic, Digital Signal Processors (DSPs), Field Programmable Gate Arrays (FPGAs), or Application Specific Integrated Circuits (ASICs). In one embodiment, a display with touchscreen capability includes display 122 and input/output system 126. Input/output system 126 may be any suitable input/output system that allows for user input/output such as, for example, a keyboard, a keypad, a stylus, a joystick, any combination thereof, or any other suitable input/output system.

In some embodiments, some or all of the electronic device 110, the control logic 124, and any other logic described herein may be implemented by executing suitable instructions on any suitable processor or computing device. In some examples, the executable suitable instructions may be stored on a computer readable storage medium, where the executable instructions are executable by one or more processors to cause the one or more processors to perform the actions described herein. Computer readable storage medium may include, for example, flash memory, any non-transitory computer readable medium such as but not limited to RAM or ROM, a cloud storage mechanism, or any other suitable storage mechanism. Some or all of this functionality may also be implemented in any other suitable manner such as but not limited to a software implementation, a firmware implementation, a hardware implementation, or any suitable combination of the example implementations described above.

As indicated in the figure, electronic device 110 may be operatively coupled to aggregated subsystem fault locations database 106 via, for example, network 102. Network 102 may be any suitable network, such as a cellular wireless communication network, WIFI network, any suitable network that provides internet access, or any other suitable network. For example, electronic device 110 may have access to network 102 over communication link 108, and aggregated subsystem fault locations database 106 may have access to network 102 over communication link 104. Aggregated subsystem fault locations database 106 may store, for example, a plurality of previously identified subsystem fault locations for each of a plurality of potential subsystem fault codes for a SUT. For example, a previously identified subsystem fault location for a potential subsystem fault code may have been identified by a technician that cleared the potential subsystem fault code by testing or troubleshooting the identified subsystem fault location (i.e., testing or troubleshooting the identified subsystem fault location corrected the issue causing the potential subsystem fault code).

As indicated in the exemplary figure, electronic device 110 may be operatively coupled to test equipment 116 over communication link 114, and may be operatively coupled to SUT 118 over communication link 112. Test equipment 116 is operatively coupled to SUT 118 over communication link 120. In one embodiment, electronic device 110 is operative to control test equipment 116 to run one or more tests on SUT 118 or a subsystem of SUT 118, such as a BIT.

In one embodiment, electronic device 110 is operable to obtain a plurality of potential subsystem fault codes for at least one subsystem of a SUT from the aggregated subsystem fault locations database 106. Electronic device 110 may then provide a system fault code failure matrix, described further with respect to FIG. 3, to display 122 that maps at least one subsystem of the SUT to a plurality of potential subsystem fault codes for that particular subsystem of the SUT. The electronic device 110 may receive, from input/output system 126, an indication of a selection (e.g., user selection) of at least one subsystem of the SUT. For example, a user may select a subsystem of the SUT from the displayed system fault code failure matrix. The electronic device 110 may then provide a subsystem fault code failure matrix to display 122 indicating the plurality of potential subsystem fault codes for the selected subsystem of the SUT. The electronic device 110 may then receive, from the input/output system 126, an indication of a fault code for a fault of the selected subsystem of the SUT. For example, a user may select a fault code from a displayed list of the plurality of potential subsystem fault codes. The electronic device 110 may then determine that the received indication of the fault code identifies with at least one potential subsystem fault code of the plurality of potential subsystem fault codes for the subsystem of the SUT obtained from the aggregated subsystem fault locations database 106. In response, the electronic device may obtain, from the aggregated subsystem fault locations database 106, at least one subsystem fault location. The electronic device 110 may then provide to display 122 an indication of the obtained subsystem fault locations. For example, electronic device 110 may provide a list of the obtained subsystem fault locations to display 122 for display. As such, electronic device 110 may inform a user of electronic device 110 that the obtained subsystem fault locations associated with the selected subsystem of the SUT should be tested or troubleshot to clear the fault code. In one embodiment, electronic device 110 may automatically cause to run a diagnostic test, such as a BIT or any other diagnostic test, based on the obtained subsystem fault locations associated with the selected subsystem of the SUT. For example, based on an obtained subsystem fault location associated with the selected subsystem of SUT 118, electronic device 110 may provide a message over communication link 112 to SUT 118 to run a BIT.

The electronic device 110 of FIG. 1 may include a user interface/experience (UX) and visualization system loaded on a portable computer or tablet in accordance with an embodiment of the invention. Some embodiments may include a database which can also generate UX/visualizations such as Microsoft® Excel or equivalence software loaded onto, e.g., a tablet or laptop computer with a storage system and optionally a network connection to access or operate embodiments of the invention Some embodiments of the invention work with fault codes associated with testing systems such as test equipment 116, which may include automatic test equipment (ATE) (not shown), which can interface with an embodiment of the invention, such as is indicated by communication link 114. Test equipment 116 may instead be used separately from electronic device 110 based on fault code data or collecting TTA information used to look up fault codes. A step leading to further aspects of an embodiment of the invention includes a step of collecting a substantial number of all fault codes used in relation to, e.g., a Built-In-Test (BIT) or testing system, such as test equipment 116, for SUT 118 (or, for example, a DUT or application software) (or if a SUT, DUT, or application does not have BIT fault codes in an ATE or built-in system, a technician can record or create fault codes when failures occur leading to troubleshooting processes and subsequently create fault code data along with associated information such as correlation to a particular fault location, or a troubleshooting step or steps for a system for further testing/replacement).

Figure 2:
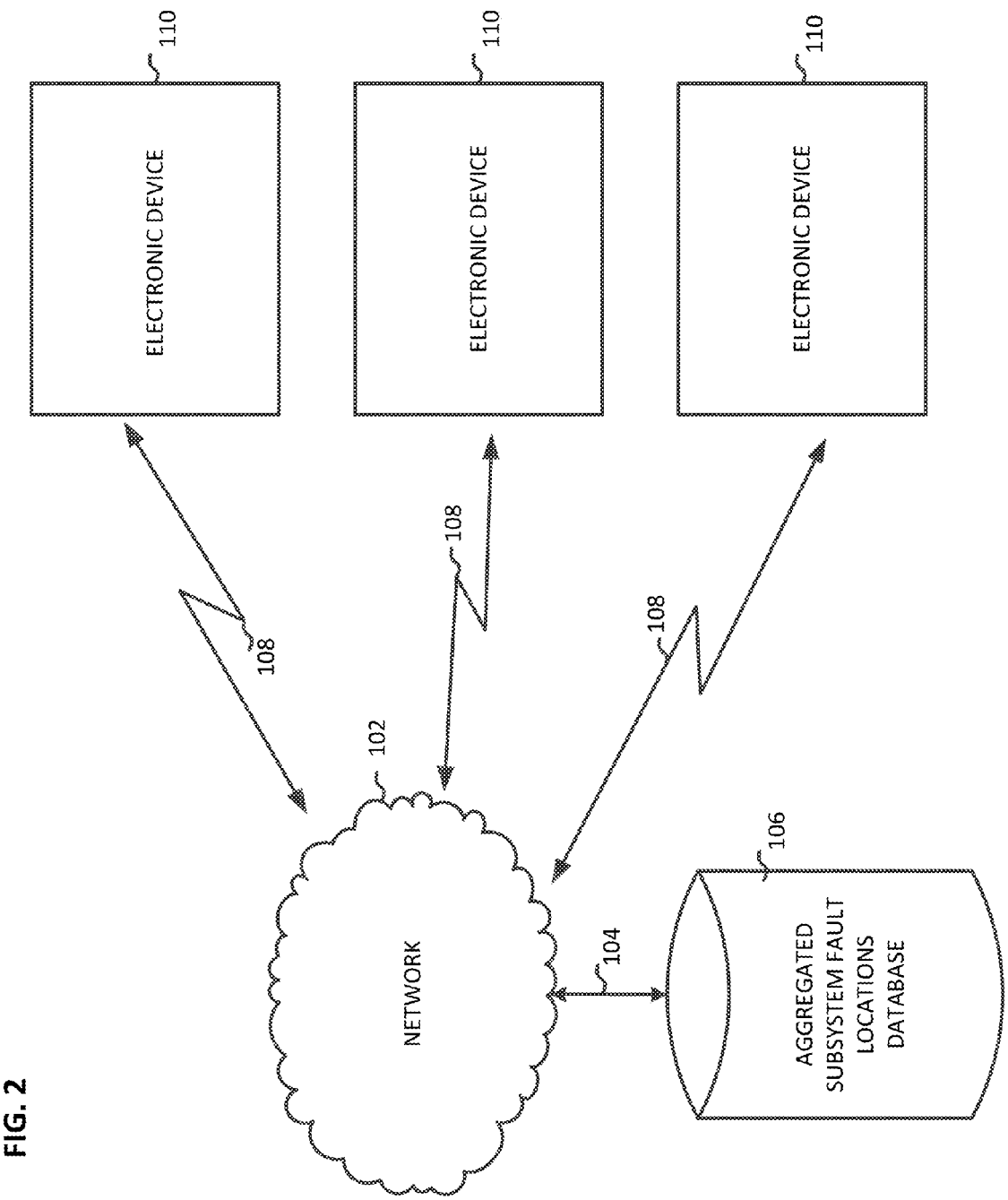
FIG. 2 is a functional block diagram including multiple electronic devices and an aggregated subsystem fault locations database according to one example of the present disclosure.

FIG. 2 is a functional block diagram including multiple electronic devices 110 and aggregated subsystem fault locations database 106. As indicated in the figure, one or more of the electronic devices 110 are operatively coupled to aggregated subsystem fault locations database 106. For example, as described above, electronic devices 110 may communicate with aggregated subsystem fault locations database 106 via network 102. As described above, a plurality of previously identified subsystem fault locations for a fault location of a subsystem of a SUT may be aggregated in aggregated subsystem fault locations database 106. As such, one or more of the electronic devices 110 are operable to provide one or more subsystem fault locations to the aggregated subsystem fault locations database 106 to be included in a plurality of previously identified subsystem fault locations, such as ones associated with a fault code for a subsystem of a SUT. The aggregated subsystem fault locations database 106 is operable to aggregate the plurality of previously identified subsystem fault locations associated with a particular fault code for the subsystem of the SUT. Electronic devices 110 may also be operable to obtain one or more of the subsystem fault locations and subsystem fault codes for the subsystem of the SUT from the aggregated subsystem fault locations database 106. As such, a user of a particular electronic device 110 is able to take advantage of previously identified subsystem fault locations for a particular subsystem fault code that may have been identified by other technicians. This may allow, for example, a user of an electronic device 110 at a remote location to more quickly or efficiently correct an issue causing a particular subsystem fault code as electronic device 110 has access to previously identified subsystem fault locations that previously led to the source of an issue causing that particular subsystem fault code.

Figure 3:
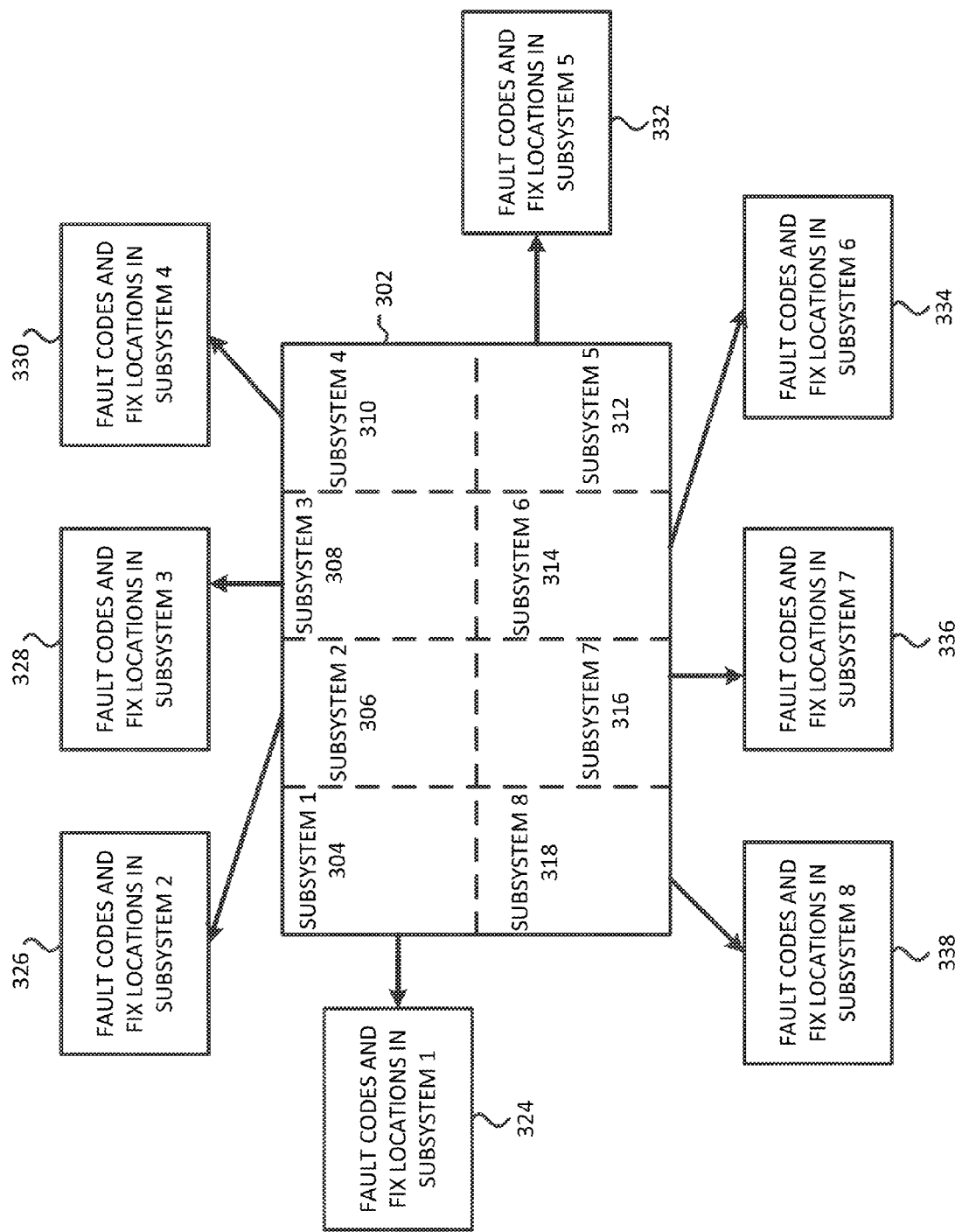
FIG. 3 is an example of a system fault code failure matrix in accordance with one example of the present disclosure.

FIG. 3 is an example of a system fault code failure matrix 302 that may be displayed, for example, by electronic device 110. System fault code failure matrix 302 includes a plurality of subsystem blocks 304, 306, 308, 310, 312, 314, 316, 318 where each may include a subsystem fault code failure matrix 324, 326, 328, 330, 332, 334, 336, 338 (e.g., exemplary FCFLMs) for an exemplary particular system, DUT, or software application identified for troubleshooting. Each fault code failure matrix 324, 326, 328, 330, 332, 334, 336, 338 may include a listing of fault codes and associated fault locations (e.g., TTA locations associated with a particular fault code of the subsystem).

FIG. 4 is an example of a subsystem fault code failure matrix 400, such as subsystem fault code failure matrix 324 of FIG. 3. As indicated in the figure, subsystem fault code failure matrix 400 shows a matrix table that contains fault codes in one column, while other columns show or record one or more possible and probable fault locations for test and troubleshooting activities that a technician has previously successfully used to identify and correct a fault. For example, subsystem fault code failure matrix 324 shows fault codes of a cable connector J-29. In this example, the fault code column depicts fault codes 1110, 1120, 1130, 1140, 1150, 1160, 1170, 1180, 1190, and 1200. These fault codes may collectively come from BIT outputs that might be supplied by a vendor, ATE, or that may be manually recorded. The fault location column can be subdivided into one or more columns, showing potential and probable fault locations where previous TTA experience found an actual fault that TTA activities corrected. For example, under the location 1 column, fault location J29-1 to 1240 (i.e., short pin J29-1 to pin 1240) appears as the first fault location for fault code 1110. More than one column can be used in this example as from time to time a fault code displayed on a test system's computer monitor is not always caused by a same hardware or software issue.

In one example, conducting tests on a subsystem's fault location as indicated by subsystem fault code failure matrix 400, such as testing locations J29-1 to 1240 for fault code 1110, does not correct the system's fault. Thus, a technician may then move to a second fault location specified in subsystem fault code failure matrix 400 for a next possible and, in some embodiments, a next most probable TTA location, such as location P29-1 to 1240, as is indicated in the location 2 column. If none of the fault locations resolve a given fault (e.g., correct the issue causing the fault code), then a technician can identify a new fault location which corrects the fault and may record the new fault location in a fault location column, such as is indicated under the location 3 column. For example, a technician may enter a new location into electronic device 110 via input/output system 126. A number of fix locations for a particular fault code is not limited as long as a technician keeps discovering new fault locations in which to perform TTAs that successfully correct a fault (e.g., clear a fault code).

As mentioned above, some embodiments may include ordering fault locations by probability of success. A fault location's probability of success may be determined, for example, based on how many times a particular subsystem fault location for a particular fault condition (e.g., condition causing a particular fault code) resulted in correction of the fault condition, and how many times it resulted in no correction, as may be maintained by aggregated subsystem fault locations database 106. For example, the fault locations for a particular fault code may be in an order such that a fault location listed (e.g., appearing) before another has a higher probability of success that the other fault location. For example, the fault location J29-3 to 1240 appearing under the location 1 column for fault code 1130, in one embodiment, has a higher probability of success to correcting an issue causing fault code 1130 than the fault location P29-3 to 1240 appearing under the location 2 column. Probabilities of success may be determined, for example, by how many times a particular fault location has led to correction of the issue causing the associated fault code. For example, a probability of success may be determined based on a percentage that is determined for each fault location indicating a percentage of a number of times that a particular fault location has led to the correction of the issue causing the associated fault code. In one example, fault locations may be displayed in an order from most probably fault location to least probably location. It is also contemplated that as new fault locations are added, and as fault locations are tested, the probabilities that a particular fault location leads to correction of an issue causing an associated fault code may change. For example, a first fault location may have a higher probability of success than a second fault location for a particular fault code. Due to subsequent troubleshooting, however, the second fault location may be found more often to successfully lead to correction of its associated fault code, such that the second fault location now is a more probably solution that the first fault location. In one example, aggregated subsystem fault locations database 106 is configured to calculate the probabilities to various fault locations. For example, the aggregated subsystem fault locations database may receive a new subsystem fault location, and may calculate the probability of success for each of the plurality of the at least one subsystem fault locations including the new subsystem fault location.

In another example, aggregated subsystem fault locations database 106 also records dates of occurrence (e.g., as provided by electronic device 110) such that fault locations are ordered based on those dates. For example, a fault location that was entered in at a later time than an earlier fault location would be displayed before the earlier fault location. In another example, a counter is maintained for each fault location of one or more fault locations associated with a particular fault code. In this example, when a fault location successfully leads to correction of a fault code, electronic device 110 provides the fault location to aggregated subsystem fault locations database 106. As such, aggregated subsystem fault locations database 106 increments a counter associated with the received fault location. In one example, fault locations for a particular fault code are displayed by, for example, electronic device 110, in an order according to their respective counter. For example, a fault location associated with a higher count is displayed before a fault location associated with a lower count.

FIG. 5 shows another example of a subsystem fault code failure matrix 500, such as subsystem fault code failure matrix 326 of FIG. 3, which may be displayed by electronic device 110. Similar to subsystem fault code failure matrix 400, a technician may utilize fault codes in one column then correlate a fault location in another column to perform a TTA process. In a case where TTAs on fault locations that were previously recorded in a given subsystem fault code failure matrix (e.g., FCFLM) do not clear out a fault, a technician may then perform what may be more time consuming troubleshooting by utilizing schematics or a technical manual to determine a fault location until the technician is able to clear the fault. The new fault location may then be recorded as a newly identified TTA/FL location into a new fault location column entry such as under the location 3 column shown in subsystem fault code failure matrix 500.

Such new fault locations can be referenced by an added symbol or identifier such as, e.g., an "*" or "new" (not shown), and may also include contact information associated with an activity (e.g., a TTA activity) which discovered and corrected the fault without an existing fault location entry. A user can continue adding new fault locations over time so as to create a dynamic and evolving FCFLM database and resulting UX/visualization. A copy of an updated system block diagram and related subsystem FCFLMs can be stored in a database file, such as a file within aggregated subsystem fault locations database 106, that can be copied and sent to, or accessed from, other locations, e.g., ships, to assist technicians, e.g., sailors, to perform trouble shooting with a same system or subsystem. In doing so, technicians onboard ships would have the latest TTAs and FCFLM methods and could facilitate their becoming a system SME without a SME that developed such knowledge independently at such field or operating locations, e.g., onboard ships. By using this fault code matrix collection method, a technician with minimum skills set, or an SME, will be able to perform troubleshooting when the individual learns how to trace the fault codes to the associated locations that are indicated (e.g., displayed) in a subsystem fault code failure matrix.

Figure 6B:
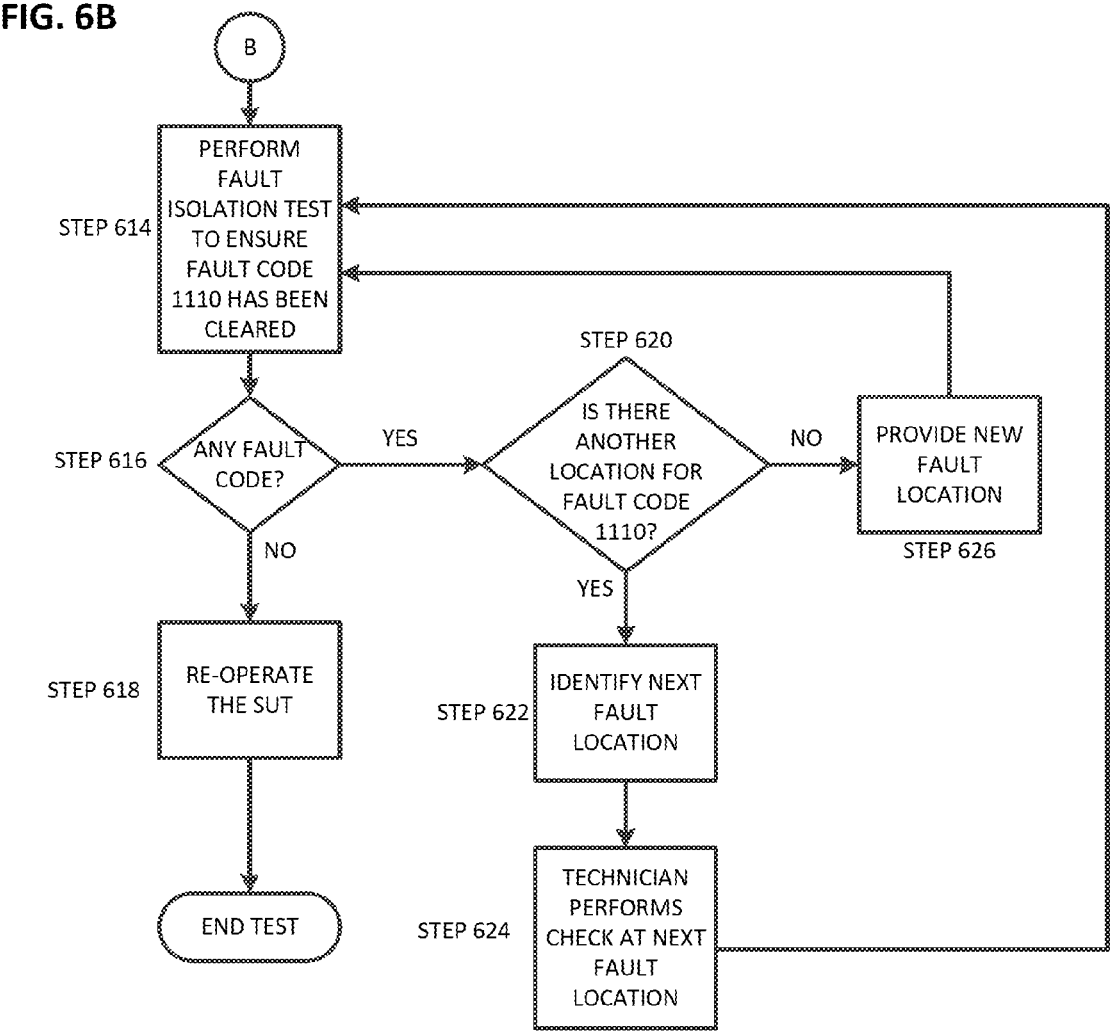
FIG. 6B is a continuation of the example flowchart of FIG. 6A in accordance with one example of the present disclosure.

FIGS. 6A and 6B illustrate an exemplary method 600 that may be realized, for example, b y test control system 100, which may also include displaying a system fault code failure matrix, such as system fault code failure matrix 302, by electronic device 110. This example also refers to the subsystem fault code failure matrices of FIGS. 4 and 5, as discussed below. In one embodiment, the process steps indicated by FIGS. 6A and 6B may be stored in a process flow database (not shown) which may store and/or display process flow chart steps, and may toggle back and forth between the flow chart and FCFLM/system block diagrams (e.g., a system fault code failure matrix or a subsystem fault code failure matrix) based on the execution of machine readable instructions, which may al so include a number of process flow data instructions used to generate the toggle function based on process step selections by, for example, a user of the system. Graphical user interface (GUI) elements may be selected, for example, via a mouse, stylus, or any other suitable input mechanism, or any cursor selection or the use of data fields which permit input of data e.g., fault codes, that allow for the selection of FCFLM selections, such as a subsystem selection in a system fault code failure matrix, or a fault code selection in a subsystem fault code failure matrix.

In various embodiments of the present disclosure, the steps or processes involved in method 600, and any other methods described herein, should not be limited to the sequence described in the present disclosure. One of ordinary skill in the art could readily understand the plurality of different options for organizing or executing the steps of the methods described herein in order to achieve substantially the same results or outcomes disclosed herein. Accordingly, the present disclosure contemplates that one of ordinary skill in the art may implement or execute one or more steps of the methods described herein in a plurality of different ways. Thus, the present disclosure should not be limited to the particular order disclosed in the methods described herein.

The method begins at step 601, where a technician or operator operates a SUT (e.g., a UAV). At step 602, the SUT encounters one or more failures and fails to operate. At step 603, the SUT indicates (e.g., a monitor displays) the exemplary fault code "1110". At step 604, the technician may optionally perform a fault isolation test on the SUT using, e.g., application software (sometimes also known as a BIT) to perform TTA activities to isolate a cause of the failure or faults. At step 605, the technician opens (e.g., accesses) an electronic device, such as electronic device 110, which in various embodiments may be a tablet or a laptop. The electronic device is pre-loaded with a system fault code failure matrix (e.g., FCFLM system and UX/visualization system file, such as a UX/visualization), which may be associated in one embodiment with an Excel® file. At step 606, a system fault code failure matrix is displayed by the electronic device. At step 607, the technician enters fault code "1110" into the system fault code failure matrix (e.g., enter fault code "1110" into the "Find" tab of an Excel® file, so that the Excel® file helps in locating the fault code) displayed by the electronic device. In an alternate embodiment, the technician selects a subsystem in the system fault code failure matrix corresponding to the subsystem causing the fault code (e.g., selection of a corresponding subsystem fault code failure matrix).

The method proceeds to step 608, where fault codes are displayed by the electronic device to the technician. The fault codes may be displayed in subsystem blocks or tables, as indicated (e.g., tables J-51, J-29, and X Pt. to Y Pt.), as part of one or more subsystem fault code failure matrices, such as subsystem fault code failure matrix 400 or subsystem fault code failure matrix 500. For example, in one embodiment, an Excel® file may include tables, where each table represents fault codes for a particular subsystem of the SUT (e.g., a subsystem fault code failure matrix). At step 609, a technician would select subsystem fault code failure matrix (e.g., table) J-29, which includes fault code "1110". Proceeding to step 610, a technician locates or selects fault code "1110" indicated (e.g., displayed) within the selected subsystem fault code failure matrix. At step 611, the technician locates (e.g., cross references) fault locations associated with fault code "1110". At step 612, the technician finds the first fault location (e.g., J29-1 to 1240 as shown in FIG. 4) to be a probable and possible fault location. At step 613, the first fault location is a first candidate fault location for fault code "1110," and thus the technician locates the J29-1 and 1240 pin locations on the SUT to perform TTA checks at those locations (e.g., short pin J29-1 to pin 1240). For example, the technician may check for any deficiencies of the system (e.g., hardware or software) under test such as a short circuit, re-set or unset pins, or a blown fuse, for example. After the technician attempts corrective action, the technician, at step 614, may next run a fault isolation test, BIT, or other test, or a test system such as an ATE, (e.g., where the technician isn't certain that the corrective action clears an encountered fault) to determine whether the fault code has been cleared.

At step 616, the technician determines whether the fault code remains. If the fault code does not remain, (e.g., issue causing fault code has been corrected), step 616 results in a "No" (e.g., fault code cleared), and at step 618 the technician may re-run normal operation of the SUT. In this case the technician has successfully corrected the SUT fault with the assistance of the FCFLM UX/visualization system. However, if the fault is shown to continue to exist at step 616, then step 616 results in a "Yes" and the method proceeds to step 620. At step 620, the technician attempts to locate another fault location in the subsystem fault code failure matrix for fault code "1110." For example, the technician may attempt to locate the next in line fault location in the subsystem fault code failure matrix, if there is one, which may be a next probable and possible fault location. If there is another fault location for fault code "1110" in the subsystem fault code failure matrix, the method proceeds to step 622. At step 622, a next fault location is identified, (e.g., second fault location P29-1 to 1240 as shown in FIG. 4) and thus at step 624 the technician performs TTA checks at that location. The method then proceeds back to step 614. If, however, at step 620, there is no other fault location available in the subsystem fault code failure matrix, the method proceeds to step 626. At step 626, the technician provides a new fault location. For example, the technician may troubleshoot the SUT and identify a new fault location. The technician may then enter, via electronic device 110, the new location to be provided to aggregated subsystem fault locations database 106 over network 102. The method then proceeds back to step 614.

Figure 7:
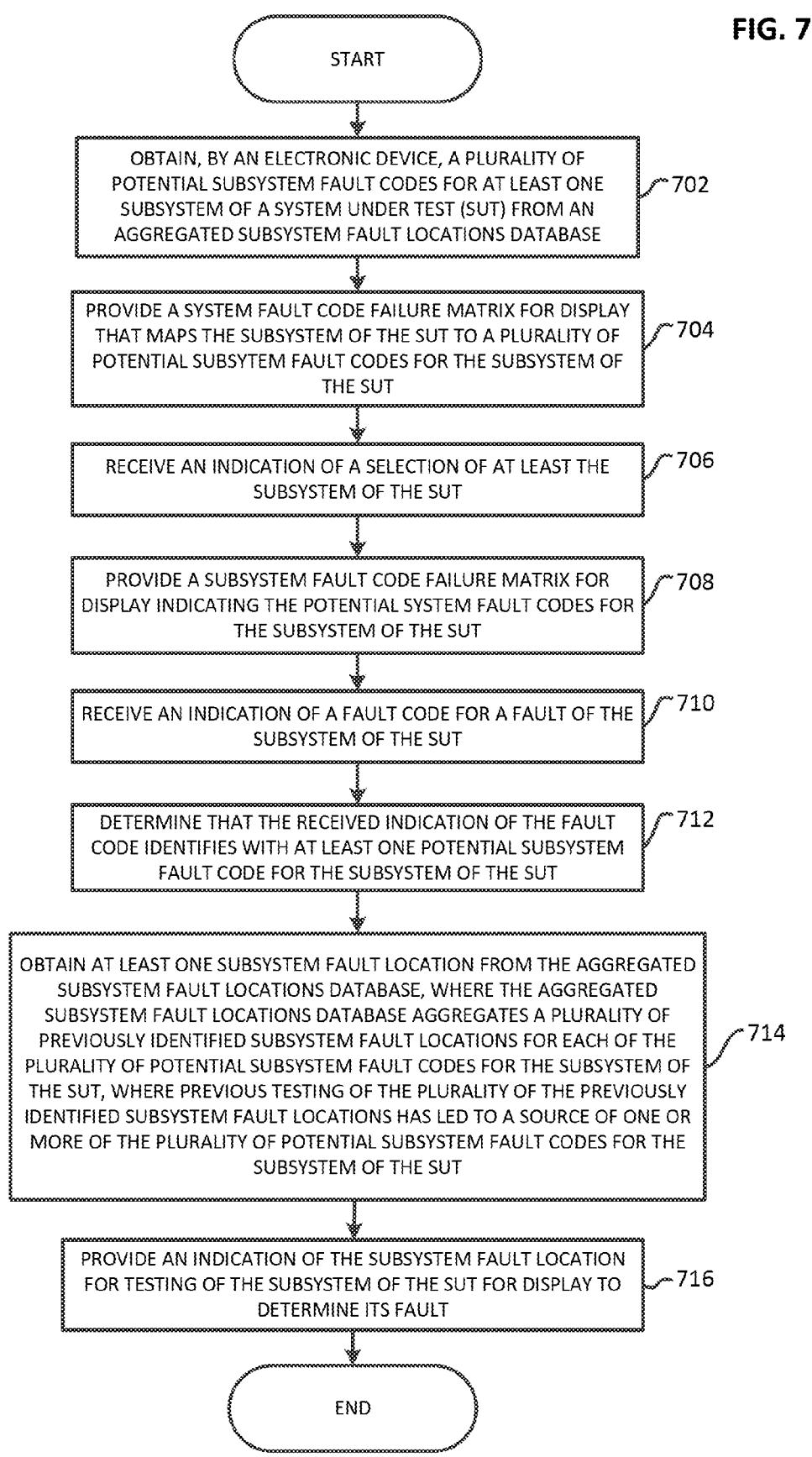
FIG. 7 is a flowchart of another example method for testing a SUT in accordance with another example of the present disclosure.

FIG. 7 is a flowchart of another example method for testing a SUT that may be realized, for example, by electronic device 110. The method begins at block 702, where a plurality of potential subsystem fault codes are obtained from an aggregated subsystem fault locations database, such as aggregated subsystem fault locations database 106, for at least one subsystem of a system under test. The method proceeds to block 704, where a system fault code failure matrix is provided for display. The system fault code failure matrix maps the subsystem of the SUT to a plurality of potential subsystem fault codes. The method then proceeds to block 706, where an indication of a selection of the subsystem of the SUT is received. For example, a user of electronic device 110 may select, from a touchscreen display displaying a system fault code failure matrix, a subsystem of the SUT. As such, the user selection of the subsystem is received as a selected subsystem. At block 708, a subsystem fault code failure matrix is provided for display indicating the potential system fault codes for the subsystem of the SUT. The method proceeds to block 710, where an indication is received of a fault code for a fault of the subsystem of the SUT (e.g., a user may select, from a touchscreen display, a fault code associated with a subsystem of a SUT). At block 712, the method determines that the received indication of the fault code identifies (e.g., matches) with at least one potential subsystem fault code for the subsystem of the SUT. The method then proceeds to block 714, where at least one subsystem fault location is obtained from the aggregated subsystem fault locations database. The aggregated subsystem fault locations database aggregates a plurality of previously identified subsystem fault locations for each of the plurality of potential subsystem fault codes for the subsystem of the SUT, where previous testing of the previously identified subsystem fault locations has led to a source of one or more of the potential subsystem fault codes for the subsystem of the SUT. The method then proceeds to block 716, where an indication of the subsystem fault location for testing the subsystem of the SUT is provided for display. For example, electronic device 110 may display the subsystem fault location.

In the foregoing specification, specific embodiments of the present disclosure have been described. However, one of ordinary skill in the art will appreciate that various modifications and changes can be made without departing from the scope of the disclosure as set forth in the claims below. Accordingly, the specification and figures are to be regarded in an illustrative, rather than a restrictive, sense, and all such modifications are intended to be included within the scope of disclosure. The benefits, advantages, solutions to problems, and any element(s) that may cause any benefit, advantage, or solution to occur or become more pronounced are not to be construed as critical, required, or essential features or elements of any or all the claims. The disclosure is defined solely by the appended claims including any amendments made during the pendency of this application and all equivalents of those claims as issued. Although the invention has been described in detail with reference to certain preferred embodiments, variations and modifications exist within the spirit and scope of the invention as described and defined in the following claims.

The invention claimed is:

1. A fault diagnostic system comprising:
   a test system configured to perform testing on a system under test (SUT) to produce one or more fault codes (FC) in response to a system failure of the SUT; and
   a diagnostic system comprising a display, a processor, and
      a storage medium operable to store a plurality of machine readable instructions that when executed by the processor cause the processor to generate a first, second, third, and fourth user experience (UX) and visualization on said display configured to graphically and textually interact with an operator using a plurality of graphical user interface (GUI) elements, wherein said first UX/visualization comprises a flow chart visualization comprising a plurality of troubleshooting steps, said second UX/visualization comprises a first system block diagram at a center section comprising a plurality of subsystems for the SUT and a plurality of first fault code fault location matrixes (FCFLM) associated with each said plurality of subsystems displayed around a periphery of the first system block diagram, wherein each FCFLM comprises a plurality of fault codes (FC) and related fault locations (FL) which are associated with previously identified FLs which have been a source of the FC as recorded by previous test and troubleshooting (TTA) activities, said third UX/visualization comprises a detail view of said FCFLM comprising said FCs and FLs, and said fourth UX/visualization comprises a search GUI associated with an element of said first UX/visualization process flow chart which enables a user to input a FC which then toggles to one of said third UX/visualizations associated with an input FC, wherein said first UX/visualization is configured to toggle between said first UX/visualization and said second through fourth UX/visualizations, said first UX/visualization is further configured to present a GUI element which selects or deselects a FL associated with a FC input so as to permit a reselection of a FC to generate a new FC/FL FCFLM display element if a previously selected FC/FL is determined not to clear a fault.

2. A process for performing diagnostics comprising:
providing a test system configured to perform testing on a system under test (SUT) to produce one or more fault codes (FC) in response to a system failure of the SUT;
providing a diagnostic system comprising a display, a storage medium operable to store a plurality of machine readable instructions that when executed by a processor cause the processor to generate a first, second, third, and fourth user experience (UX) and visualization on said display configured to graphically and textually interact with an operator using a plurality of graphical user interface (GUI) elements, wherein said first UX/visualization comprises a flow chart visualization comprising a plurality of troubleshooting steps, said second UX/visualization comprises a first system block diagram at a center section comprising a plurality of subsystems for the SUT and a plurality of first fault code fault location matrixes (FCFLM) associated with each said plurality of subsystems displayed around a periphery of the first system block diagram, wherein each FCFLM comprises a plurality of fault codes (FC) and related fault locations (FL) which are associated with previously identified FLs which have been a source of the FC as recorded by previous test and troubleshooting (TTA) activities, said third UX/visualization comprises a detail view of said FCFLM comprising said FCs and FLs, and said fourth UX/visualization comprises a search GUI associated with an element of said first UX/visualization process flow chart which enables a user to input a FC which then toggles to one of said third UX/visualizations associated with an input FC, wherein said first UX/visualization is configured to toggle between said first UX/visualization and said second through fourth UX/visualizations, said first UX/visualization is further configured to present a GUI element which selects or deselects a FL associated with a FC input so as to permit a reselection of a FC to generate a new FC/FL FCFLM display element if a previously selected FC/FL is determined not to clear a fault; and
operating said test system and said diagnostic system on a SUT to determine a fault based on FC/FL identified TTAs and determining that a TTA and corrective action at a selected FL has cleared the fault code by rerunning said test system which does not produce a previously displayed FC.

3. The process of claim 2, further comprising:
attempting TTAs and corrective actions at all FC/FLs shown by said first through fourth UX/visualizations and said test system continues to determine that the previously displayed FC continues to exist;
performing additional TTAs based on diagnostics from a source outside the diagnostic system and identifying a cause of the FC and successfully performing corrective action to clear the FC; and adding a new FC/FL based on the additional TTA information to a diagnostic system's database containing the FC/FL correlation data.

* * * * *